(12) United States Patent
Graef et al.

(10) Patent No.: US 12,027,924 B2
(45) Date of Patent: Jul. 2, 2024

(54) METHOD FOR PRODUCING A STATOR ARRANGEMENT

(71) Applicant: Dr. Ing. h.c. F. Porsche Aktiengesellschaft, Stuttgart (DE)

(72) Inventors: Rolf Graef, Kornwestheim (DE); Patrick Knecht, Stuttgart (DE); Peter Wurster, Kornwestheim (DE); Markus Omlor, Wuerzburg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 220 days.

(21) Appl. No.: 17/690,467

(22) Filed: Mar. 9, 2022

(65) Prior Publication Data

US 2022/0337136 A1 Oct. 20, 2022

(30) Foreign Application Priority Data

Apr. 20, 2021 (DE) ..................... 10 2021 109 872.6

(51) Int. Cl.
*H02K 15/00* (2006.01)
(52) U.S. Cl.
CPC ................. *H02K 15/0081* (2013.01)
(58) Field of Classification Search
CPC .............................. H02K 3/12; H02K 15/0081
See application file for complete search history.

(56) References Cited

U.S. PATENT DOCUMENTS

| 6,865,796 B1 | 3/2005 | Oohashi et al. |
| 7,948,140 B2 * | 5/2011 | Sakai ................... H02K 15/064 310/180 |
| 10,254,552 B2 * | 4/2019 | Mitra ................... G02B 27/283 |

(Continued)

FOREIGN PATENT DOCUMENTS

| CN | 205355698 | 6/2016 |
| DE | 10 2018 200035 | 7/2019 |

(Continued)

OTHER PUBLICATIONS

German Search Report dated Jan. 3, 2022.
(Continued)

*Primary Examiner* — Paul D Kim
(74) *Attorney, Agent, or Firm* — Gerald E. Hespos; Michael J Porco

(57) ABSTRACT

A method is provided for producing a stator arrangement that has a stator core and a winding arrangement. The stator core has stator slots. The winding arrangement has winding elements with a conductor and an insulation layer. Each winding element has two interconnected winding element legs with two winding element end portions on each winding element leg. The method includes positioning the winding elements on the stator core so that the winding element legs extend through one of the stator slots with winding element end portions protruding on a first side of the stator core. The method then includes using a first laser arrangement to remove the insulation layer from regions of the winding element end portions. The method then includes pressing the first and second winding element end portions against one another and using a second laser arrangement to carry out welding.

15 Claims, 6 Drawing Sheets

(56) References Cited

U.S. PATENT DOCUMENTS

2010/0229902 A1* 9/2010 Kanzaki .................. H01L 22/12
  134/56 R
2019/0280577 A1  9/2019 Ponzio et al.
2020/0083787 A1* 3/2020 Fujiyoshi ........... H02K 15/0081

FOREIGN PATENT DOCUMENTS

DE        102018125838 A1   4/2020
WO        2019115059        6/2019

OTHER PUBLICATIONS

Trumpf Laser-Und Systemtechnik GmbH: eDrive Production Solutions. Hannover Messe Digital Edition, Online (12.-16.04.2021).
Trumpf Laser-Und Systermtechnik GmbH: White paper—Manufacturing electric motors: stripping and welding hairpins using a laser. Ditzingen, 2019. 10 Seiten.-Firmenschrift.
RWTH Aachen: Produktionsprozess eines Hairpin-Stators. PEM der RWTH Aachen und VDMA Eigendrunk, 1. Auflage, Oct. 2019—ISBN: 978-3-947920-08-02.

* cited by examiner

METHOD FOR PRODUCING A STATOR ARRANGEMENT

CROSS REFERENCE TO RELATED APPLICATION

This application claims priority under 35 USC 119 to German Patent Appl. No. 10 2021 109 872.6 filed on Apr. 20, 2021, the entire disclosure of which is incorporated herein by reference.

BACKGROUND

Field of the Invention. The invention relates to a method for producing a stator arrangement.

Related Art. WO 2019/115 059 A1 discloses a method for stripping the insulation from a flat wire on a stator of an electric machine. The method uses laser light to strip the insulation element at a stripping region.

DE 10 2018 200 035 A1 discloses using 3D printing as part of a process for electrically connecting hairpin ends of a rotor or stator.

US 2019/0280577 A1 discloses a method for producing a stator in which winding elements are formed by bending a conductor and inserting the winding elements into stator slots. A laser beam is used to strip the insulation from the winding elements.

U.S. Pat. No. 6,865,796 discloses a method for producing a stator for an alternator in which coil components are formed by cutting and bending a wire material. The ends of the wire are connected to form a winding group by welding together end portions.

CN 205 355 698 U discloses an insulation stripping device for a multilayer wire. Different laser beams are used to peel off different materials of the multilayer wire.

An object of the invention is to provide a method for producing a stator arrangement.

SUMMARY

A method is provided for producing a stator arrangement that has a stator core and a winding arrangement. The stator core has stator slots and defines a stator axis. The winding arrangement has winding elements that have a conductor with an insulation layer. Each winding element has two interconnected winding element legs, and each winding element leg has a winding element end portion with a winding element end. The method comprises positioning the winding elements in relation to the stator core in such a way that the winding element legs respectively extend through one of the stator slots and the winding element end portions protrude on a first axial side of the stator core. The method then includes using a first laser arrangement for removing the insulation layer at least in certain regions on a first winding element end portion of a first winding element and a second winding element end portion of a second winding element. The method then includes pressing the first winding element end portion and the second winding element end portion against one another and using a second laser arrangement for welding the first and second winding element end portions to one another.

The using the first laser arrangement for stripping the insulation increases the reliability of the welding process. The first and second welding arrangements may be different welding arrangements to allow optimized wavelengths.

The steps of using the first and second laser arrangements may be repeated for further winding element end portions to be welded to one another. The entire connection can therefore be carried out by the method.

The step of using the first laser arrangement for removing the insulation layer may further comprise using at least one transporting device for transporting away the particles occurring during the removal of the insulation layer from the first group of devices. The transporting device may comprise a suction removal device and may further comprise a blower device that is active, at least for a time. The step of using the transporting device reduces the risk of surrounding areas of the stator arrangement being contaminated by the particles and increases the reliability of the process.

The method further may comprise deforming and displacing at least one of the first winding element portion and the second winding element portion in the circumferential direction with respect to the exit point from the stator core. This deformation allows winding element end portions that are to be connected to be brought into the vicinity of one another.

The method may comprise altering a radial distance of the winding element end portions from the stator axis as compared with the radial distance at the exit point from the stator core. This step facilitates guiding the winding elements past one another.

The steps of using the first and second laser arrangements may be performed at a single working station to avoid the need for transporting into an additional working station and thereby achieving a time reduction.

The step of using the first laser arrangement may comprise directing at least one laser beam onto an assigned point of impingement of the first or second winding element end portion so that an angle of impingement between the laser beam and the direction of extent of the winding element end portion in the direction of the winding element end is greater than 0° and less than 90° with respect to the stator axis. Additionally, at least two laser beams may be directed simultaneously onto assigned points of impingement, at least for a time.

An angle of impingement in this range has been found to be advantageous for the stripping of the insulation in the partially mounted state, since with an angle of 0° the stripping of the insulation is scarcely possible and with an angle of 90° or greater some of the winding element end portions are only poorly accessible.

In some embodiments, the angle of impingement lies between 30° and 60°, preferably between 40° and 50°. These angles of impingement have been found in tests to provide a particularly advantageous introduction of heat along with sufficient accessibility.

The step of using the first laser arrangement for removing the insulation layer is carried out in some embodiments so that the laser beam impinging on the respective winding element end portion always follows a path in a straight line from a first point of the laser arrangement to the winding element end portion. The first point is arranged on the side of the winding element end of the winding element end portion that is facing away from the stator core. This arrangement of the first point allows an advantageous path of the laser beam to the winding element portion.

The step of using the first laser arrangement for removing the insulation layer is carried out in some embodiments so that the laser beam impinging on the first winding element end portion crosses through at least one predetermined first space. The first space is obtained by displacing the face of the second winding element end of the second winding element end portion in the direction of the stator axis away from the stator assembly. This aiming of the second winding element end onto the first winding element end portion can increase the energy input at certain points of impingement and/or can allow insulation to be stripped over a larger surface area.

The step of using the first laser arrangement for removing the insulation layer is carried out in some embodiments so that two or more laser beams impinge simultaneously on the stator arrangement so that the stripping of the insulation can be carried out more quickly.

The method may comprise using a positioning device with two positioning elements that are movable back and forth relative to one another between a first state and a second state. The positioning elements of some embodiments are designed so that, in the first state, the positioning elements allow a limited movement of two winding element end portions at least in one predetermined direction. In the second state, the positioning elements press the winding element end portions against one another and thereby allow the welding. The positioning device may be in the first state for at least part of the time when using the first laser arrangement for removing the insulation layer, and may be at least partially in the second state when using the second laser arrangement for welding the first and second winding element end portions to one another. Thus, the positioning device leads to efficiencies both during stripping of the insulation in the regions between the winding element end portions and also during the subsequent welding step.

In some embodiments the positioning device is not removed from the first and second winding element end portions between using the first and the second laser arrangements, but rather remains at the winding element end portions. The positioning device can therefore be made to assume the second state directly after using the first laser arrangement so that the welding can take place very quickly after removing the insulation. Additionally, the risk of contamination occurring during renewed moving of the positioning device is reduced.

The first laser arrangement may be moved during use to direct the laser beam onto different points of impingement. At least part of this movement may take place in a straight line to facilitate stripping the insulation at different points.

At least one of the laser arrangements may have a controllably movable mirror to allow controllable deflection of the laser beam.

The first and second winding element end portions may be at a distance from one another when using the first laser arrangement to allow stripping the insulation in regions between the winding element portions. The regions of the winding element portions that are on the outside after the welding can be stripped of insulation either with the winding element end portions at a distance from one another (first state) or with the winding element end portions pressed together (second state of the positioning device).

Further details and advantageous developments of the invention will become apparent from the embodiments described in the following text and shown in the drawings. The descriptions should not be understood as limiting the invention in any way. Rather, the features mentioned above and those explained below can be used in the combinations specified and also in other combinations or on their own without departing from the scope of the invention.

DETAILED DESCRIPTION

Figure 8:
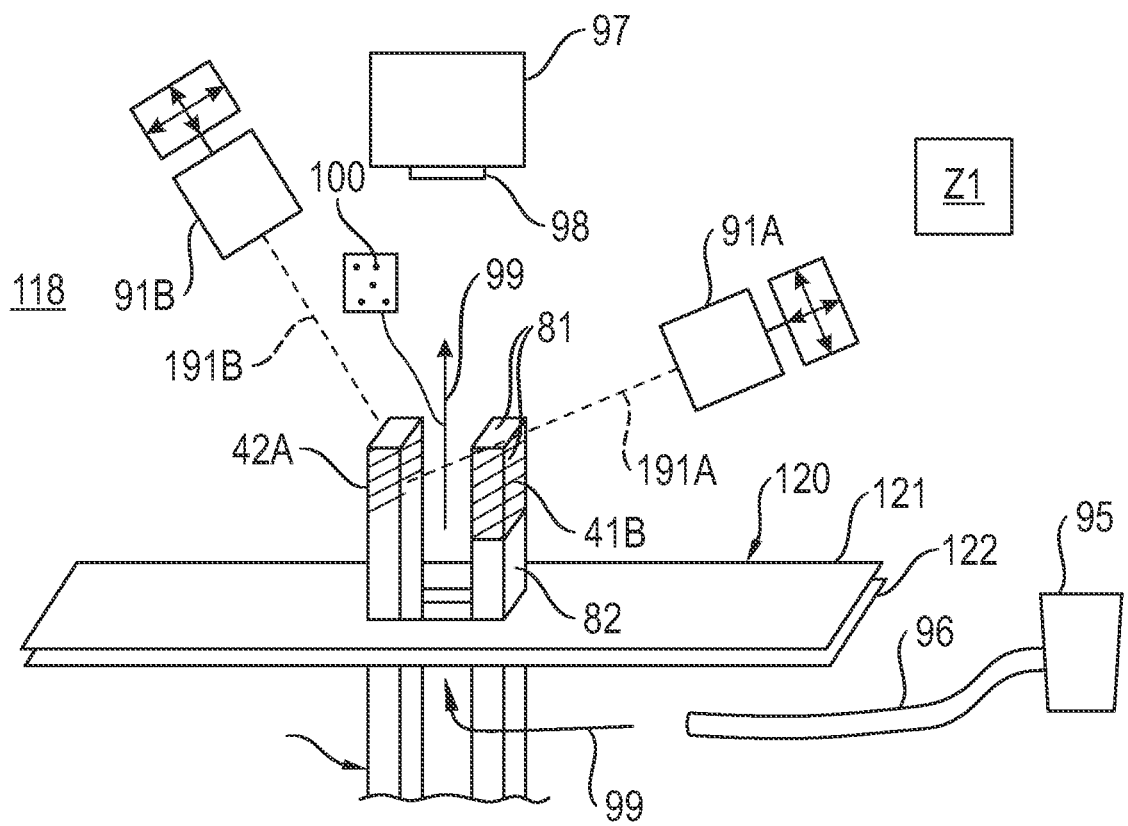

FIG. 8 schematically shows stripping of the insulation from the winding element end portions at the positioning device.

Figure 9:
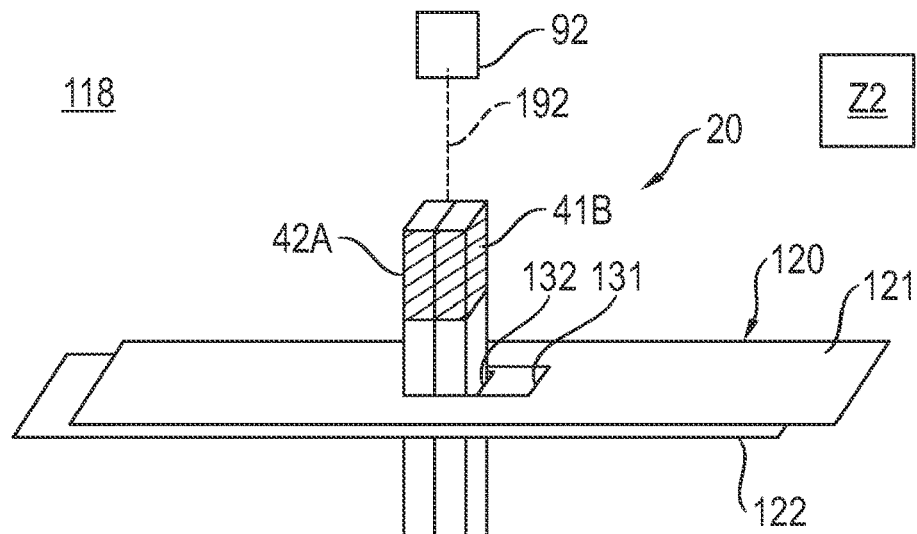

FIG. 9 schematically shows the positioning device in a second state to clamp the winding element end portions against one another for welding.

Figure 10:
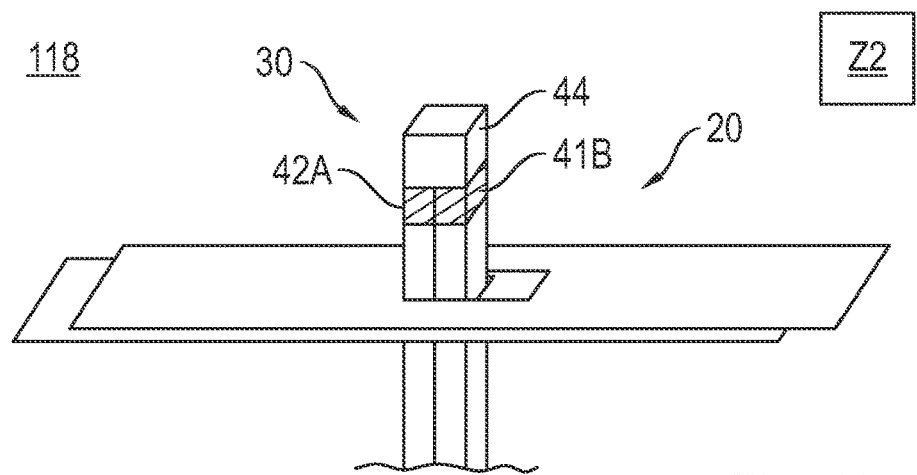

FIG. 10 schematically shows the contacted winding element end portions with the positioning device.

Figure 11:
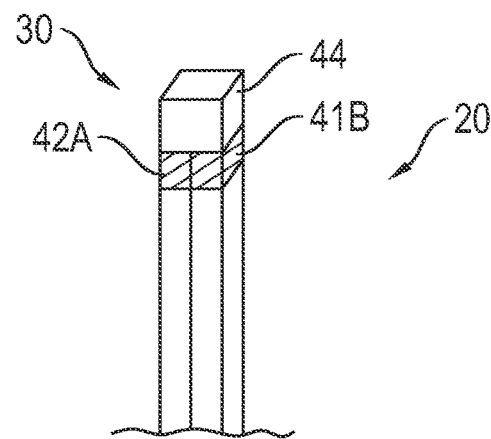

FIG. 11 schematically shows the contacted winding element end portions after removal of the positioning device.

Figure 12:
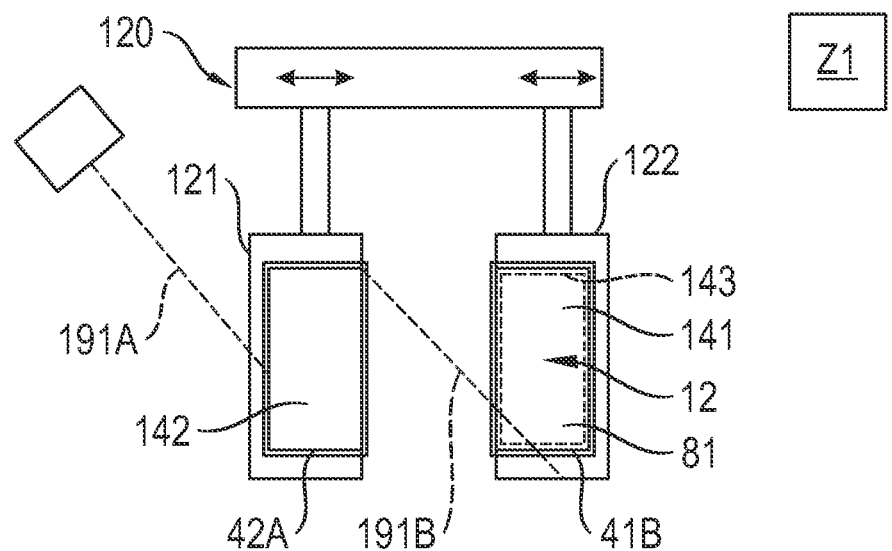

FIG. 12 is a plan view of a further embodiment of the positioning device with gripping elements.

Figure 13:
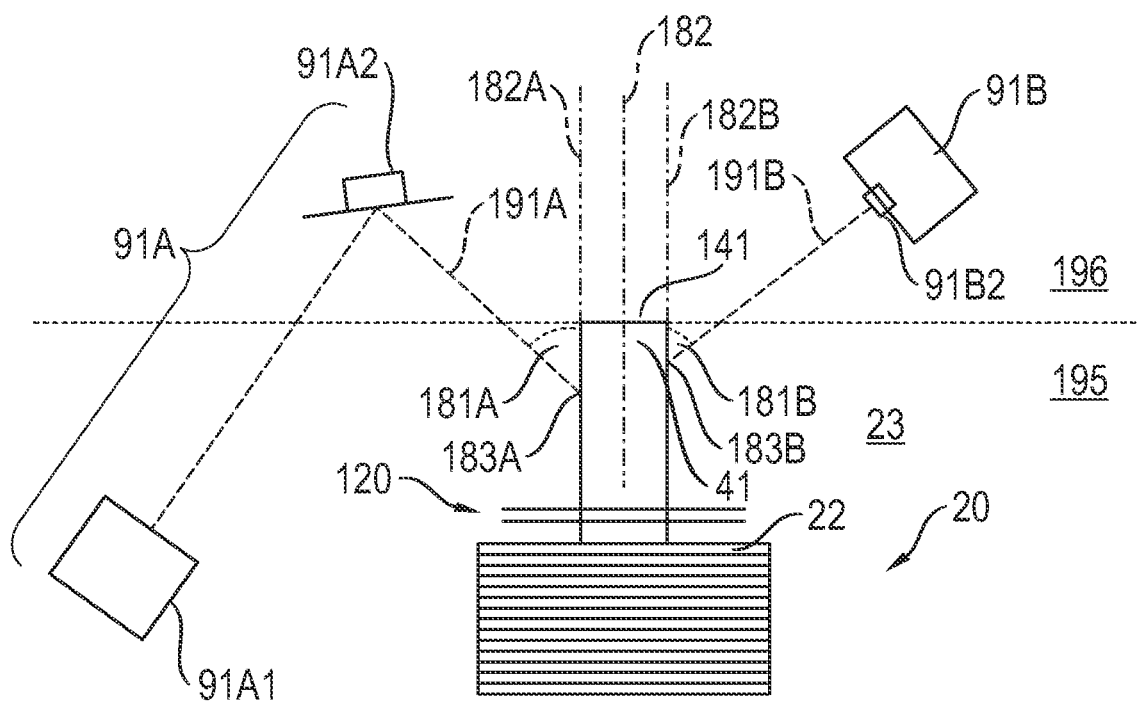

FIG. 13 schematically shows two laser arrangements.

DETAILED DESCRIPTION

In the following text, parts that are identical or act in an identical manner are provided with the same reference signs and are usually described only once. The descriptions of all of the figures build on one another to avoid unnecessary repetition.

Relative terms, such as left, right, top and bottom, that are used in the following text relate to the respective figure that is being described.

Figure 1:
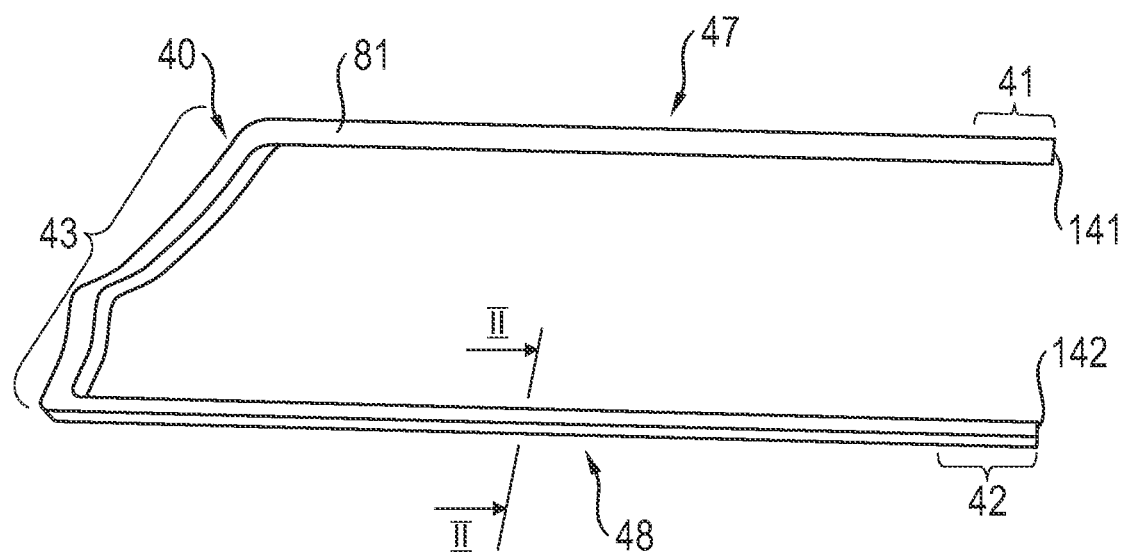
FIG. 1 is a plan view of a winding element with a conductor.
Figure 4:
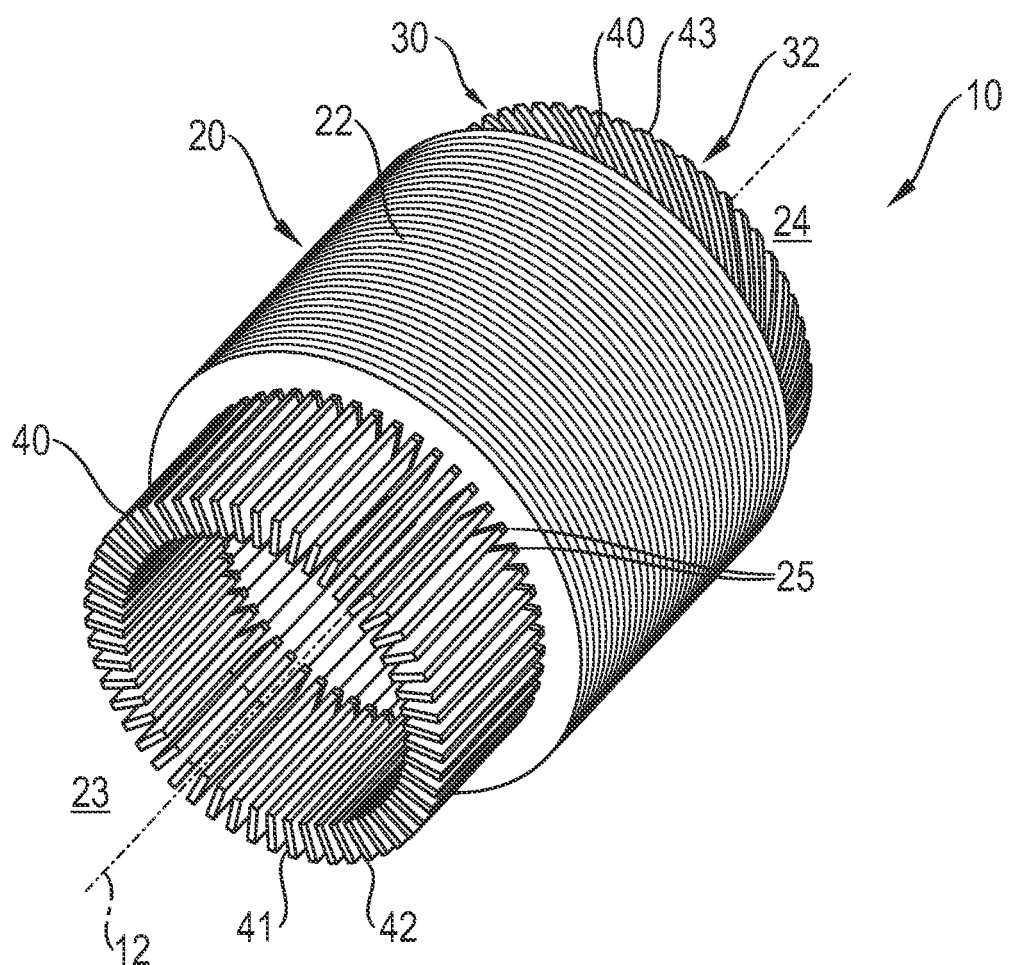
FIG. 4 is a perspective view of the stator arrangement of FIG. 2 after a first production step

FIG. 1 shows a winding element 40 that can be used for the production of a stator arrangement (cf. FIG. 4). The winding element 40 has a conductor 81 that may be a single-wire conductor (for example a flat-wire conductor) or as a stranded conductor. The winding element 40 has a first leg 47, a second leg 48, a connecting portion 43, a first end portion 41 with a first end 141 and a second end portion 42 with a second end 142. The first end portion 41 is connected to the first leg 47, and the second end portion 42 is connected to the second leg 48. The connecting portion 43 connects the first leg 47 to the second leg 48.

Winding elements 40 of this form also are referred to as hairpins.

Figure 2:
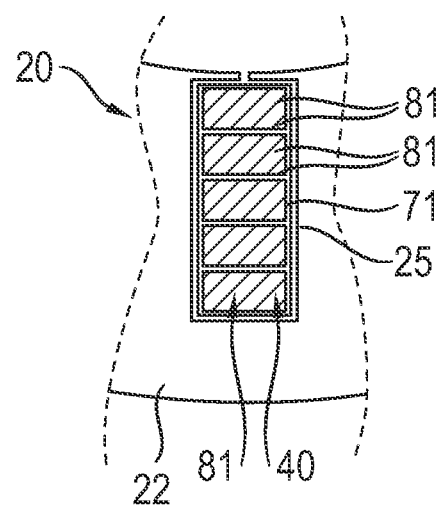
FIG. 2 is a cross section of a stator arrangement with the winding element from FIG. 1.

FIG. 2 is a schematic cross section through a stator arrangement 20. The stator arrangement 20 has a stator core 22 that may be a laminated core. The winding elements 40 are shown in section along the sectional line II-II of FIG. 1. The stator core 22 has a slot 25, through which the conductors 81 extend. In the exemplary embodiment, five conductors 81 extend through the slot 25, but the number can be varied, depending on the size of the stator arrangement 20 and the desired power.

Insulating paper 71 preferably is provided around the conductors 81 to reduce the risk of a short circuit to the stator core 22. As an alternative or in addition, impregnation with an insulating material, for example with plastic, may take place.

The conductors 81 have, at least in certain portions, a rectangular base shape to achieve a high degree of filling of the stator slot 25. The base shape may however also be for example round or generally rectangular.

Figure 3:
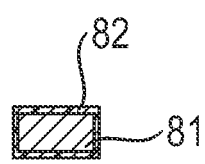
FIG. 3 is a cross section of the conductor of FIG. 1.

FIG. 3 shows a conductor 81 provided on its outside with an insulation layer 82, for example an enamel layer or a wire enamel. As a result, a conducting connection between the conductors 81 or to the stator core 22 is prevented. The insulation between the conductors 81 is not necessarily required because of the potential difference, since the individual wires 81 of a winding element 40 are in many cases connected in the end portions 41, 42 with the same winding terminal. When higher frequencies are used, the outer surface area of the conductors 81, which is particularly relevant for the current flow on account of the skin effect, can be increased by the insulation. It is also possible that only some of the conductors 81 have an insulation layer 82.

FIG. 4 shows the stator arrangement 20 with the stator core 22 and a winding arrangement 30. The stator core 22 has the slots 25 and defines a stator axis 12 that may also be referred to as the longitudinal axis 12, a first axial side 23 and a second axial side 24 opposite from the first axial side 23. The winding elements 40 have been pushed into the laminated core 22 from the second axial side 24, so that the first end portion 41 and the second end portion 42 are arranged on the first axial side 23. The connecting portions 43 are arranged on the second axial side 24 and form an end winding there (also referred to as a winding overhang) 32 to define a region of the winding arrangement 30 extending axially beyond the laminated core 22. The legs 47, 48 are arranged, at least in certain regions, in an assigned slot 25.

After the pushing in the winding elements 40, steps must be carried out to form a properly connected winding arrangement 30 and to provide winding terminals.

Figure 5:
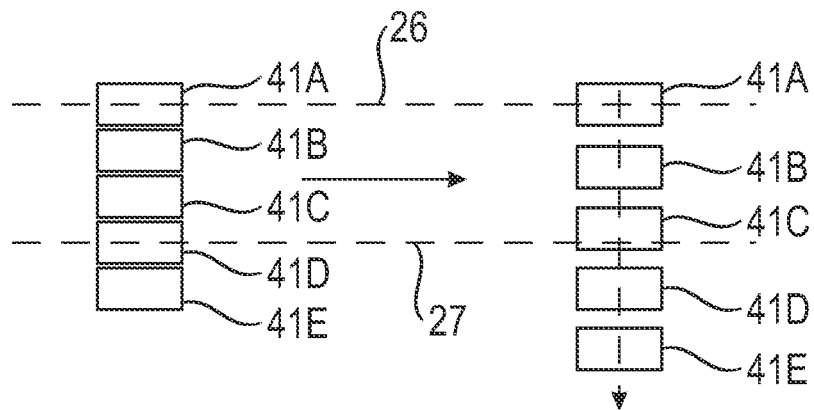
FIG. 5 shows the stator arrangement of FIG. 4 after a second production step.

FIG. 5 schematically shows a working step referred to as expanding, in which five end portions 41A, 41B, 41C, 41D, 41E of a slot 25, which—as shown on the left—lie next to one another after the pushing in of the winding elements 40, are at least partially spaced radially further apart from one another. The lines 26, 27 each indicate an equal radial distance from the stator axis 12 from FIG. 4, the radial distance of the line 26 being less than the radial distance of the line 27. It is a developed representation, and in reality the lines 26, 27 are circular.

It can be seen on the right side that the end portions 41B, 41C, 41D, 41E have been displaced radially outward by deformation. This step is advantageous to create space for connecting the end portions 41A, 41B, 41C, 41D, 41E. A radially inward displacement is also possible, or a partially inward and partially outward displacement.

Figure 6:
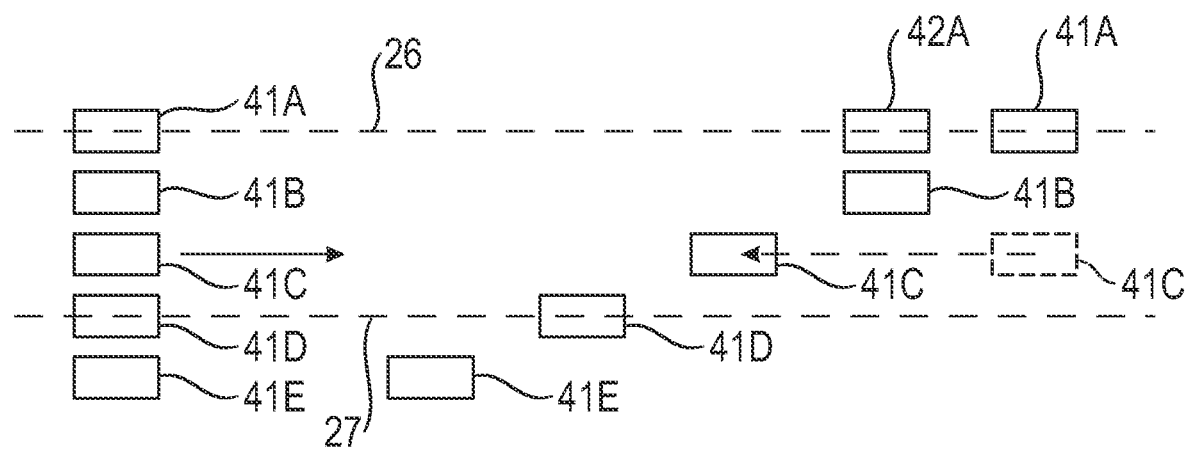
FIG. 6 shows the stator arrangement of FIG. 4 after a third production step.

FIG. 6 schematically shows a working step referred to as twisting, in which the end portions 41, 42 are at least partially displaced in the circumferential direction to allow connecting to other end portions 41, 42. The lines 26, 27 again respectively indicate a constant distance from the stator axis 12 from FIG. 4, the radial distance of the line 26 being less than the radial distance of the line 27. As in FIG. 5, it is a developed representation, and in reality the lines 26, 27 are circular.

On the left side, the end portions 41A, 41B, 41C, 41D, 41E are shown in the state after the expanding according to FIG. 5. The right side shows the state after the twisting, and the end portions 41B, 41C, 41D, 41E have been displaced to the left in the circumferential direction. For the end portion 41C, the starting position is shown by a dashed line, and the position after the twisting is shown by solid lines. As an alternative or in addition, the end portions may be (partially) displaced to the right or else partially remain unchanged in the circumferential direction.

By way of example, an end portion 42A is arranged adjacent to the end portion 41B to allow connecting of the two end portions 42A, 41B, for example by welding. In this way, connecting of the winding arrangement 30 comprising the winding elements 40 can take place. In the exemplary embodiment, the two end portions 41B, 42A to be connected are provided radially in relation to one another, but they may also be arranged next one another in the circumferential direction or obliquely to the circumferential direction and to the radial direction.

During the twisting, the regions of the winding elements protruding from the stator slots 25 are bent, for example by a robot. The path followed during the twisting is preferably along the circumferential direction, but other paths are also possible.

Figure 7:
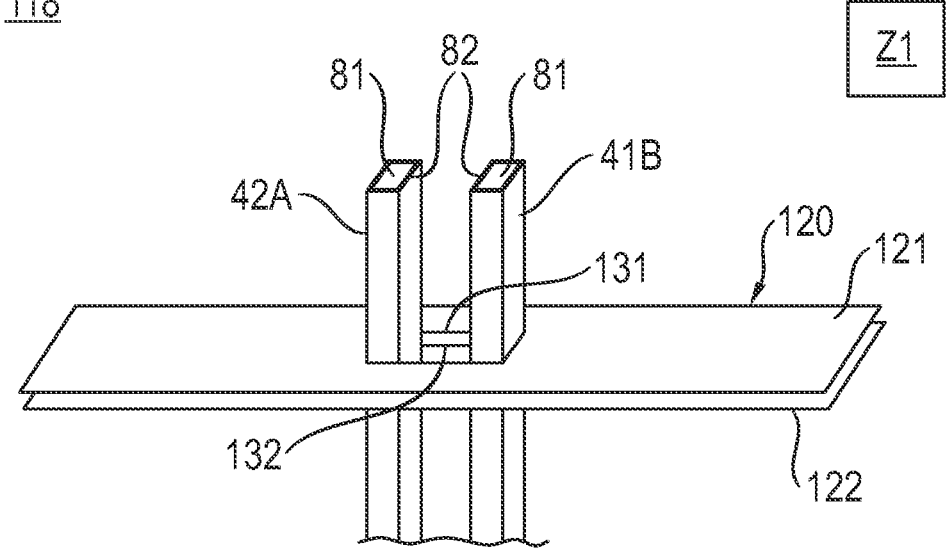
FIG. 7 is a perspective view of a working station with a positioning device in a first state and two winding element end portions at a distance from one another.

FIG. 7 shows a working station 118 with a positioning device 120, which may also be referred to as a clamping device 120. In the exemplary embodiment, the positioning device 120 has a first positioning element 121 with a first clearance 131 and a second positioning element 122 with a second clearance 132.

The two end portions 42A and 41B pass through the two clearances 131, 132. The positioning device 120 is in a first state Z1, in which the two end portions 42A and 41B can be at a distance from one another. In the exemplary embodiment, for this purpose the two clearances 131, 132 overlap in a first region, which allows an intermediate space between the end portions 42A and 41B. This may either involve making use of the fact that the end portions 42A, 41B stay at a distance from one another of their own accord as a result of their elastic property, or they may be moved apart by the positioning device 120, for example by a third positioning element (not shown), which can be moved into the region between the end portions 42A, 41B.

The insulation layer 82 is still provided on the end portions 42A and 41B, which may also be referred to as pins.

FIG. 8 shows a production step, in which the insulation layers 82 on the end portions 42A and 41B are at least partially removed to allow welding of the end portions 42A and 41B to one another by a reliable process.

The positioning device 120 is still in the first state Z1, and the end portions 42A and 41B are at a distance from one another. Stripping of the insulation from the end portions 42A and 41B preferably takes place with a laser. For this purpose, in the exemplary embodiment, a laser 91A and a laser 91B are provided. The laser 91A generates a laser beam 191A, and the laser 91B generates a laser beam 191B. The laser beams 191A and 191B preferably have a wavelength that is absorbed well by the insulation layer 82 and leads to heating and evaporation of the insulation layer 82.

A suction removal device 97 and/or a blower device 95 preferably are provided in order to transport of the particles 100 produced during the evaporation away from the stator arrangement 20. For this purpose, the suction removal device 97 and/or the blower device 95 produce a fluid stream 99 that at least partially transports the particles 100 away. In the exemplary embodiment, the blower device 95 has a tube 96, and the suction removal device 97 has a suction removal opening 98.

In the exemplary embodiment, the laser beams 191A, 191B impinge on the end portions 42A and 41B obliquely from above, the end portions 42A, 41B facing upward. A perpendicular angle of impingement on the insulation layer 82 at the surface of the end portions 42A and 41B allows the greatest absorption. Since, however, in the case of the stator arrangement 20 there may be a large number of end portions 41, 42 after the twisting and, even in the case of two end portions 42A, 41B, at least one side is covered by the other end portion, respectively, a laser beam perpendicular to the surface to be irradiated is not possible, or at least not in all cases. The situation is different in the case of stripping of the insulation from the conductors 81 before they are formed into the winding element 40, in which the straight conductor 81 can be irradiated perpendicularly.

The alignment of the laser beams obliquely from above can—depending on the movement of the lasers 91A, 91B—lead to a particular appearance of the stripped region of the end portions 42A and 41B, in which the traces of the laser beams 191A and 191B do not follow a path transversely to the direction of extent of the end portions 42A, 41B but obliquely to the direction of extent. This is the case for example when there is an oblique angle of incidence and a straight movement of the laser 91A, 91B, which straight movement follows a path that is not parallel to one of the sides of the end portions 42A, 41B. With each of the lasers 91A, 91B, two side faces of the end portions 42A, 41B can be treated from a predetermined laser position. With an arrangement of the lasers 91A, 91B on opposite sides of the end portions 42A and 41B, all four sides of a rectangular cross section can be stripped of insulation.

An alteration of the direction of the laser beam 191A, 191B can take place either by a movement of the entire laser 91A, 91B or else by way of a movable mirror for influencing the laser beam 191A, 191B, cf. FIG. 13.

As schematically shown, during the stripping of the insulation, the first laser arrangement 91A or 91B is moved, at least in certain regions, to direct the laser beam 191A, 191B onto different points of impingement 183A, 183B. The movement preferably is at least partially in a straight line, but may take place in a curved manner or freely.

FIG. 9 shows the positioning device 120 in a second state Z2 where the end portions 42A and 41B lie against one another and are pressed against one another. This can be brought about by the positioning elements 121, 122 being displaced in relation to one another. Either or both of the positioning elements 121, 122 may be displaced.

The end portions 42A and 41B are pressed together, and the positioning device 120 may also be referred to as a clamping device. The stripped regions of the end portions 42A and 41B lie against one another and may also be welded to one another by a laser 92. The laser 92 preferably emits a laser beam 192, the wavelength of which is well suited for absorption by the material of the conductor 81, and consequently leads to heating of the end portions 42A and 41B and to a welded connection. The laser 92 is either different from the first laser 91, or if appropriate the same laser may be used.

The movement of the positioning elements 121, 122 between the first state Z1 and the second state Z2 may be characterized as follows. In the first state Z1, the positioning elements 121, 122 limit a movement of two end portions 41B, 42A to be contacted, at least in one predetermined direction, and at the same time allow a distance between the end portions 41B, 42A to be contacted. There is therefore no need for the end portions 41B, 42A to be securely held, but their movement should be limited at least to the extent that the position is exact enough for the stripping of the insulation. In the second state Z2, the positioning elements 121, 122 press the winding element end portions 41B, 42A to be contacted against one another to allow the welding.

The positioning device 120 preferably is not removed from the end portions 41B, 42A between the stripping of the insulation (FIG. 8) and the welding (FIG. 9) to shorten the process time.

FIG. 10 shows in a schematic representation the result of the welding operation from FIG. 9. The energy input by the laser beam 192 from FIG. 9 has led to heating and melting of the end portions 42A and 41B with subsequent connection, and the welded connection 44 forms electrical contacting between the end portions 42A and 41B. In reality, the welded connection 44 may also have rounded edges, if corresponding heating of the entire free end of the end portions 42A and 41B takes place.

The method steps of FIG. 7 to FIG. 10 preferably all take place in the working station 118, and therefore the stator arrangement 20 does not have to be transported into another working station.

FIG. 11 shows the finished welded connection 44 of the end portions 42A and 41B after removal of the positioning device 120. For this purpose, the positioning device 120 is preferably brought back into the first state Z1 and subsequently displaced relatively upward or away from the stator core 22.

FIG. 12 shows in a schematic plan view two end portions 42A, 41B and a further embodiment of the positioning device 120. The stator core 22 is not shown. The positioning device 120 has two positioning elements 121, 122, the positioning element 121 being in contact with three sides of the end portion 42A and the positioning element 123 being in contact with three sides of the end portion 41B. The positioning elements 121, 122 are movable in relation to one another. In the first state Z1 shown, the end portions 41B, 42A are at a distance from one another, and, by a relative movement toward one another, the end portions 41B, 42A can be brought into contact.

The positioning elements 121, 122 may have grippers for gripping the end portions 41B, 42A, or they may simply limit a movement upward and downward and also laterally outward in the representation by acting as a stop. The positioning elements 121, 122 may also only be in contact with the respective end portion 41B or 42A, or act as a stop, on two sides.

In the stripping of the insulation, the laser beam 191B impinging on the end portion 42A preferably crosses through at least one predetermined first space 143, which first space 143 extends away from the stator assembly 22 as a result of displacement of the face of the end 141 of the end portion 41B in the direction of the stator axis 12. In graphic terms, the laser beam 191B follows a path via the adjacent end portion 41B. In the same way, in the stripping of the insulation from the end portion 41B, the laser beam 191A preferably follows a path via the adjacent end portion 42A. This geometry allows insulation to be stripped well and over a larger surface area in spite of the spatial proximity of the end regions 41B and 42A.

In the stripping of the insulation, the laser beams 191A and 191B are preferably generated simultaneously, at least for a time.

FIG. 13 shows in a schematic representation the stator arrangement 20 with the stator core 22 and an end portion 41 shown enlarged. The other end portions 41, 42 are not shown. Two laser arrangements 91A, 91B are schematically indicated.

In the stripping of the insulation, the laser beam 191A impinges with an angle of impingement 181A on an assigned point of impingement 183A of the end portion 41. The angle of impingement 181A is the angle at the point of impingement 183A between the laser beam 191A and the direction of extent 182 or 182A of the end portion 41 in the direction of the end 141. The angle of impingement 181A is preferably greater than 0° and less than 90°, preferably at least two laser beams 191A, 191B being directed simultaneously, at least for a time, onto assigned points of impingement 183A, 183B. The laser beam 191B impinges in the same way with an angle of impingement 181B on the point of impingement 183B, and the direction of extent at this point is shown by 182B.

The angles of impingement 181A and 181B preferably lie, at least for a time, between 30° and 60°, more preferably between 40° and 50°.

In the stripping of the insulation, the laser beam 191A, 191B impinging on the end portion 41 preferably follows a path from a first point 91A2 or 91B2 of the laser arrangement 91A or 91B in a straight line to the winding element end portion 41, which first point 91A2 or 91B2 is arranged on the side 195 of the end of the end portion 41 that is facing away from the stator core 22. The side 195 that is facing the stator core 22 and the delimiting line are depicted. To put it another way, the first points 91A2 and 91B2 lie on the first axial side 23 of the stator core 22 and are at a greater axial distance from the stator core 22 than the end 141 of the end portion 41. In the exemplary embodiment, the first point 91A2 is a mirror, which is irradiated by a base unit 91A1. The mirror 91A2 preferably allows controllable deflection of the laser beam 191A. The first point 91B2 is an exit of the laser arrangement 91B.

Of course, a variety of variations and modifications are possible within the scope of the invention.

Apart from the connection of the end portions 41, 42 to one another, the end portions 41, 42 may also be used for connecting to a connecting device that is not shown. For this purpose, the end portions 41, 42 concerned are preferably likewise stripped of insulation in the working station 118 and subsequently connected to a conductor—not shown—of the connecting device. Winding terminals—not shown—for connecting to an end stage are preferably provided at the stator arrangement 20.

In the exemplary embodiments, the positioning devices 120 are respectively intended for two end portions 41, 42. They may also be intended for more than two end portions 41, 42, or further positioning devices 120 may be provided. In the case of an arrangement of the end portions 41, 42 to be connected in relation to one another in the circumferential direction, the positioning device 120 may have two positioning elements 121, 122, which positioning elements 121, 122 are in the form of disks with clearances and can be turned in relation to one another in order thereby to allow the first state Z1 and the second state Z2 as in the case of the positioning device 120 from FIG. 7.

What is claimed is:

1. A method for producing a stator arrangement (20) that has a stator core (22) and a winding arrangement (30), the stator core (22) having stator slots (25) and a stator axis (12), the winding arrangement (30) having winding elements (40), each of the winding elements (40) having a conductor (81) with an insulation layer (82) and being formed with two interconnected winding element legs (47, 48) having winding element end portions (41, 42) with winding element ends (141; 142), the method comprising:
    positioning the winding elements (40) in relation to the stator core (22) so that the winding element legs (47, 48) respectively extend through one of the stator slots (25) and the winding element end portions (41, 42) protrude on a first axial side (23) of the stator core (22);
    deforming the first winding element portion (41B) and the second winding element portion (42A) in a circumferential direction with respect to an exit point from the stator core (22) and to achieve an altered radial distance from the stator axis (12) as compared with a radial distance of the exit point from the stator core (22);
    using a first laser arrangement (91A, 91B) on a first winding element end portion (41B) of a first of the winding elements (40) and on a second winding element end portion (42A) of a second of the winding elements (40) for removing the insulation layer (82) at least in certain regions; and
    pressing the first winding element end portion (41B) and the second winding element end portion (42A) against one another and using a second laser arrangement (92) for welding the first winding element end portion (41B) and the second winding element end portion (42A) to one another.

2. The method of claim 1, further comprising repeating the steps of using the first laser arrangement (91A, 91B), pressing the first and second winding element end portions (41B, 42A) against one another and using the second laser arrangement (92) at further winding element end portions (41, 42).

3. The method of claim 1, wherein using the first laser arrangement (91A, 91B) for removing the insulation layer (82) at least in certain regions further comprises using a suction removal device (97) and a blower device (95) for transporting away particles (100) of the insulation layer (82) separated during removal of the insulation layer (82).

4. The method of claim 1, wherein using the first laser arrangement (91A, 91B) and the second laser arrangement (92) are carried out a single working station (118).

5. The method of claim 1, wherein using the first laser arrangement (91A, 91B) is carried out so that a laser beam (191A; 191B) impinging on the first winding element end portion (41B; 42A) crosses through at least one predetermined first space (143), the predetermined first space (143) being obtained by displacing a face of the second winding element end (142; 141) of the second winding element end portion (42A) in a direction of the stator axis (12) away from the stator assembly (22).

6. The method of claim 1, wherein using the first laser arrangement (91A, 91B) is carried out so that at least two laser beams (191A; 191B) impinge simultaneously on the stator arrangement (20), at least for a time.

7. The method of claim 6, further comprising providing a positioning device (120) with two positioning elements (121, 122) that are movable in relation to one another back and forth between a first state (Z1) and a second state (Z2), the positioning elements (121, 122) are designed so as
    in the first state (Z1), the positioning elements (121, 122) limit a movement of two winding element end portions (41B; 42A) to be contacted, at least in one predetermined direction, and at the same time allowing a distance between the winding element end portions (41B; 42A) to be contacted, and
    in the second state (Z2), the positioning elements (121, 122) press the winding element end portions (41B; 42A) to be contacted against one another to allow the welding,
    the positioning device being at least partially in the first state (Z1) when using first laser arrangement (91A, 91B) and being at least partially in the second state (Z2) when using second laser arrangement (92).

8. The method of claim 7, wherein the positioning device is not removed from the first winding element end portion (41B; 42A) and the second winding element end portion (42A; 41B) between using the first and second laser arrangements.

9. The method of claim 1, wherein using the first laser arrangement (91A, 91B) is carried out while the first winding element end portion (41B) and the second winding element end portion (42A) are at a distance from one another, at least for a time.

10. A method for producing a stator arrangement (20) that has a stator core (22) and a winding arrangement (30), the stator core (22) having stator slots (25) and a stator axis (12), the winding arrangement (30) having winding elements (40), each of the winding elements (40) having a conductor (81) with an insulation layer (82) and being formed with two interconnected winding element legs (47, 48) having winding element end portions (41, 42) with winding element ends (141; 142), the method comprising:
  positioning the winding elements (40) in relation to the stator core (22) so that the winding element legs (47, 48) respectively extend through one of the stator slots (25) and the winding element end portions (41, 42) protrude on a first axial side (23) of the stator core (22);
  using a first laser arrangement (91A, 91B) on a first winding element end portion (41B) of a first of the winding elements (40) and on a second winding element end portion (42A) of a second of the winding elements (40) for removing the insulation layer (82) at least in certain regions; and
  pressing the first winding element end portion (41B) and the second winding element end portion (42A) against one another and using a second laser arrangement (92) for welding the first winding element end portion (41B) and the second winding element end portion (42A) to one another by directing at least one laser beam (191A; 191B) onto an assigned point of impingement (183A; 183B) of the first or second winding element end portion (41B, 41A) at an angle of impingement (181A; 181B) between the laser beam (191A; 191B) and a direction of extent (182; 182A; 182B) of the winding element end portion (41, 42) in a direction of the winding element end (141; 142), the angle of impingement (181A; 181B) being greater than 0° and less than 90°, and wherein directing at least one laser beam (191A; 191B) comprises directing at least two laser beams simultaneously onto assigned points of impingement (183A, 183B), at least for a time.

11. The method of claim 10, wherein after positioning the winding elements (40) in the stator core (22) so that the winding element end portions (41, 42) protrude on the first axial side (23) of the stator core (22), the method further includes deforming the first winding element portion (41B) and the second winding element portion (42A) in a circumferential direction with respect to an exit point from the stator core (22) and to achieve an altered radial distance from the stator axis (12) as compared with a radial distance of the exit point from the stator core (22).

12. The method of claim 10, wherein the angle of impingement (181A; 181B) is between 30° and 60°.

13. A method for producing a stator arrangement (20) that has a stator core (22) and a winding arrangement (30), the stator core (22) having stator slots (25) and a stator axis (12), the winding arrangement (30) having winding elements (40), each of the winding elements (40) having a conductor (81) with an insulation layer (82) and being formed with two interconnected winding element legs (47, 48) having winding element end portions (41, 42) with winding element ends (141; 142), the method comprising:
  positioning the winding elements (40) in relation to the stator core (22) so that the winding element legs (47, 48) respectively extend through one of the stator slots (25) and the winding element end portions (41, 42) protrude on a first axial side (23) of the stator core (22);
  using a first laser arrangement (91A, 91B) on a first winding element end portion (41B) of a first of the winding elements (40) and on a second winding element end portion (42A) of a second of the winding elements (40) for removing the insulation layer (82) at least in certain regions; and
  pressing the first winding element end portion (41B) and the second winding element end portion (42A) against one another and using a second laser arrangement (92) for welding the first winding element end portion (41B) and the second winding element end portion (42A) to one another, wherein using the first laser arrangement (91A, 91B) is carried out so that a laser beam (191A; 191B) impinging on the respective winding element end portion (41; 42) follows a path in a straight line from a first point (91A2; 9162) of the laser arrangement (91A; 91B) to the winding element end portion (41; 42), the first point (91A2; 91B32) being on the side (196) of the winding element end (141) of the winding element end portion (41; 42) that is facing away from the stator core (22).

14. The method of claim 13, wherein using the first laser arrangement (91A, 91B) comprises moving parts of the first laser arrangement in a straight line to achieve different points of impingement (183A; 183B).

15. The method of claim 14, wherein the first laser arrangement (91A, 91B) has a controllably movable mirror (91A2) to allow controllable deflection of the laser beam (191A; 191B).

* * * * *